(12) United States Patent
Sahr et al.

(10) Patent No.: US 6,991,537 B2
(45) Date of Patent: Jan. 31, 2006

(54) DEFLECTOR FOR A DISCHARGE OUTLET OF A TAILINGS CONVEYOR OF AN AGRICULTURAL COMBINE

(75) Inventors: Andrew Sahr, Geneseo, IL (US); James R. Schmidt, Blue Grass, IA (US); Denver R. Yoder, Lancaster, PA (US)

(73) Assignee: CNH America LLC, Racine, WI (US)

( * ) Notice: Subject to any disclaimer, the term of this patent is extended or adjusted under 35 U.S.C. 154(b) by 164 days.

(21) Appl. No.: 10/623,727

(22) Filed: Jul. 21, 2003

(65) Prior Publication Data

US 2005/0020333 A1 Jan. 27, 2005

(51) Int. Cl.
*A01F 12/52* (2006.01)

(52) U.S. Cl. .......................................... 460/12; 460/119
(58) Field of Classification Search ................ 460/119, 460/11–14
See application file for complete search history.

(56) References Cited

U.S. PATENT DOCUMENTS

| | | | |
|---|---|---|---|
| 688,823 A | 12/1901 | Bowers | |
| 1,275,770 A | 8/1918 | Scott | |
| 2,309,736 A | * 1/1943 | Makin | 460/14 |
| 2,310,610 A | 2/1943 | Bissell | |
| 2,696,820 A | 12/1954 | Allison | |
| 2,974,668 A | 3/1961 | Witzel | |
| 3,976,084 A | * 8/1976 | Weber | 460/14 |
| 4,317,326 A | 3/1982 | Riedinger | |
| 4,466,447 A | 8/1984 | Hoefer et al. | |
| 4,677,991 A | 7/1987 | Harris et al. | |
| 4,921,469 A | 5/1990 | Scharf | |
| 6,148,595 A | 11/2000 | Rabe et al. | |
| 6,669,558 B1 | * 12/2003 | Wolters et al. | 460/14 |

FOREIGN PATENT DOCUMENTS

EP        576737 A1  *  1/1994

* cited by examiner

*Primary Examiner*—Meredith Petravick
(74) *Attorney, Agent, or Firm*—Brant T. Maurer; Rebecca Henkel (57) ABSTRACT

A deflector for a discharge outlet of a tailings conveyor of a harvesting machine for providing tailings dispersal over a sieve of a cleaning system or other location on the harvesting machine, without significantly interfering with crop material flow from a threshing system of the combine and while also preventing entry of crop material from the threshing system into the conveyor outlet.

16 Claims, 10 Drawing Sheets

DEFLECTOR FOR A DISCHARGE OUTLET OF A TAILINGS CONVEYOR OF AN AGRICULTURAL COMBINE

BACKGROUND

This invention relates generally to an agricultural harvesting machine, and more particularly, to a deflector for a discharge outlet of a tailings conveyor of a harvesting machine for providing tailings dispersal over a sieve of a cleaning system or other location on the harvesting machine, without interfering with crop material flow from a threshing system of the combine and while also preventing entry of crop material from the threshing system into the conveyor outlet.

Typically, an agricultural harvesting machine such as a combine gathers crop from a field and transports the crop by means of a feeder house to a threshing and separating device located inside the combine. Generally, threshing refers to removing grain, beans, seeds or kernels, hereinafter referred to as just grain, which are desired to be collected, from husks, cobs, pods, stems, and other portions of the plants being harvested, which are to be discarded. The threshing and separating device delivers the crop to the cleaning system of the combine, which includes a plurality of sieves. An upper sieve allows clean grain and some material other than grain (MOG) to fall through it, and a lower sieve is adjusted so that only clean grain is allowed to pass through it. The material including the clean grain and MOG that falls through the upper sieve, but does not pass through the lower sieve, is called tailings. In many cases it is desired for this material to be threshed and/or cleaned again.

Prior methods accomplish the threshing and/or cleaning of the tailings by conveying them to one side of the combine with an auger. The tailings are then carried by a conveyor, typically a paddle and chain conveyor, back to the combine threshing mechanism. Some combines have used a rethreshing device which is separate from the threshing system which helps save capacity on the threshing system by rethreshing the tailings separately from new crop coming into the combine. The auger feeds material into the rethreshing device and then the material is conveyed back to the cleaning system. Both single impeller/blowers and augers have been used to convey this material back to the cleaning system. These rethreshing devices are usually convertible, enabling the operator to manipulate the machine to be more or less aggressive, depending on the vulnerability of the grain to damage, during processing.

Prior methods for conveying the tailings material have been found to be inefficient in terms of throughput capacity and power consumption. Some known embodiments have resulted in large conveying devices that tend to limit access to both the combine and the conveying device for maintenance and conversion.

When returning tailings to the cleaning system, one problem to be avoided is interference between the flow of tailings to the cleaning system and the flow of crop material from the separator to the cleaning system. Another problem to be avoided is the discharge of the tailings onto the upper sieve at a location or locations or in a manner so as to overload the sieve or which is ineffective. Still another problem to be avoided is the directing of crop material from the threshing system into the discharge outlet of the tailings return system.

Therefore, what is needed is a more efficient means for conveying tailings, which overcomes many of the shortcomings and problems set forth above.

SUMMARY

What is disclosed is a to a deflector for a discharge outlet of a tailings conveyor of a harvesting machine for providing desired tailings dispersal over a cleaning system of the harvesting machine, thereby providing more efficiency, and which overcomes many of the shortcomings and problems set forth above, including among others, interference with flow of crop material from the threshing system of the combine.

According to a preferred aspect of the invention, the tailings conveyor has a discharge outlet disposed above a sieve of the cleanings system of the combine for discharging a flow of the tailings along an upwardly directed flow path oriented at an acute angle to horizontal, and the deflector includes an upper deflector panel positionable adjacent to and above an upper region of the outlet so as to extend downwardly into the flow path at an acute angle to horizontal. The deflector includes a side deflector panel positionable adjacent a side region of the outlet so as extend into the flow path at an acute angle thereto. As a result, all or a desired portion of the flow of the tailings discharged through the outlet along the flow path will impinge the panels and be deflected downwardly and outwardly away from the side deflector panel so as to be dispersed in a desired efficient pattern over a region of the sieve, preferably an even pattern over a region of the sieve for receiving crop materials from the threshing system, without significantly interfering with the normal material flow from the threshing system.

DETAILED DESCRIPTION OF THE PREFERRED EMBODIMENTS

Figure 1:
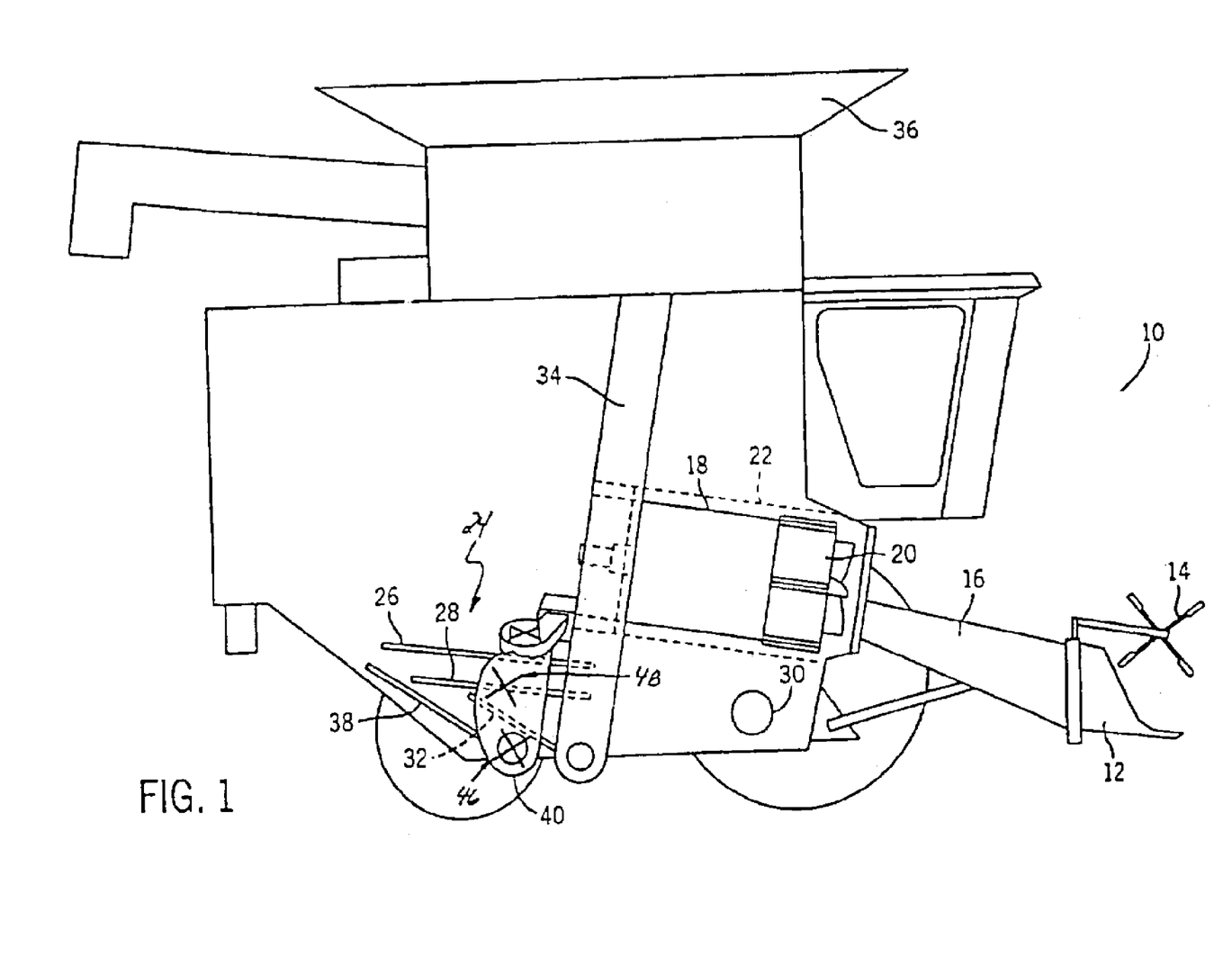
FIG. 1 is a simplified side view illustrating an embodiment of the major components of an agricultural harvesting machine.
Figure 2:
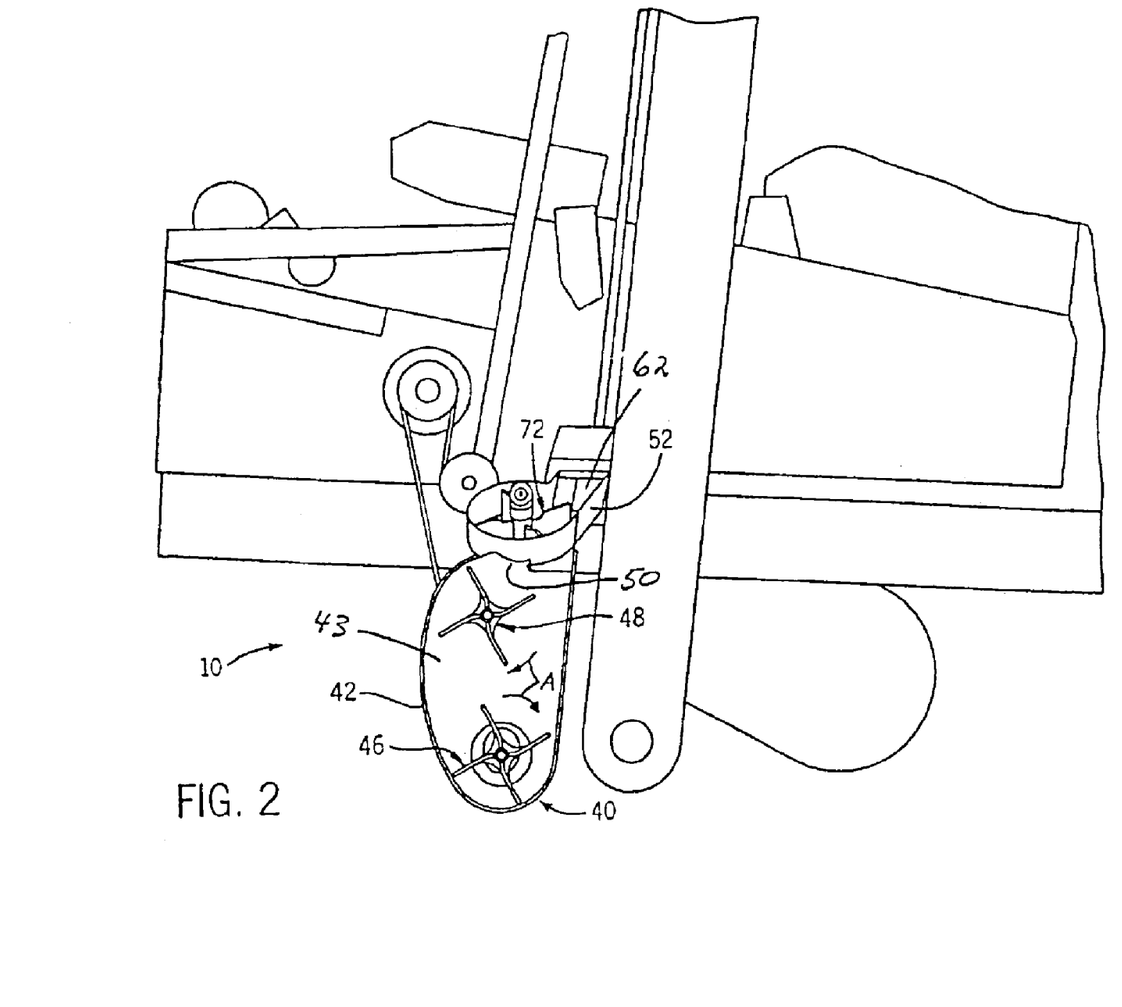
FIG. 2 is a simplified view of the harvesting machine of FIG. 1 depicting an embodiment of a tailings conveyor within the machine with a front cover of the conveyor removed to show internal aspects thereof including several rotary impellers.

Referring to FIG. 1, an agricultural harvesting machine 10, incorporating the principles of the instant invention, has a header 12, a reel 14, and a feeder 16. Crop material is collected by header 12 and reel 14 and taken into agricultural harvesting machine 10 through feeder 16 in a conventional manner.

A threshing assembly 18 includes a rotor 20 and a perforated housing 22. Rotor 20 is rotated within perforated housing 22. Crop is received from feeder 16 and is passed through clearances between rotor 20 and perforated housing 22 to thresh grain. Grain which is threshed in the clearances between housing 22 and rotor 20 falls through the perforations in housing 22 and is transported to a cleaning system 24 including a chaffer sieve 26 and a shoe sieve 28. Chaffer sieve 26 and shoe sieve 28 are members that oscillate back and forth. Sieves 26 and 28 have a plurality of apertures for allowing the properly threshed grain to fall through. A blower 30 blows air through sieves 26 and 28 and out the rear of agricultural harvesting machine 10. Chaff will be blown outward along with the air. The clean grain falls through sieves 26 and 28 onto an inclined plane 32. Clean grain travels along plane 32 and then through a grain elevator 34, to a grain storage area 36.

Grain and material other than grain (MOG), which is too heavy to become air borne and falls through chaffer sieve 26 but does not pass through shoe sieve 28 is commonly known as tailings. Tailings end up on a plane 38 and are rethreshed and conveyed in a tailings conveyor 40 and discharged from tailings conveyor 40 onto chaffer sieve 26.

As is best seen in FIGS. 2–6, tailings conveyor 40 includes a housing 42 including an interior portion 43; a first opening 44 communicating with interior portion 43; a first rotary impeller 46 and a second rotary impeller 48 located in interior portion 43; and a second opening 50 communicating with interior 43 and a conduit 52. A third impeller 72 is located in conduit 52. The first and second impellers 46 and 48 are each rotated in predetermined rotational directions A on shafts 58 and 51, respectively, about substantially parallel rotational axes C and D extending longitudinally through the centers of shafts 58 and 51, respectively. The third impeller 72 may rotate in the opposite direction or as alternative in the same direction as the bottom two impellers 46 and 48.

Figure 3:
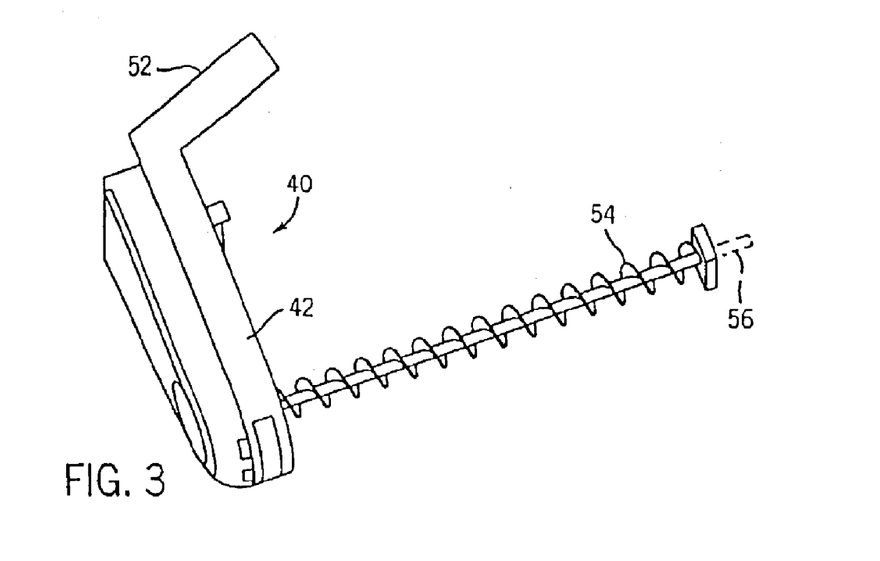
FIG. 3 is a simplified fragmentary perspective view of an embodiment of the conveyor of FIG. 2 in association with a feed auger of the machine for feeding tailings to the conveyor.
Figure 4:
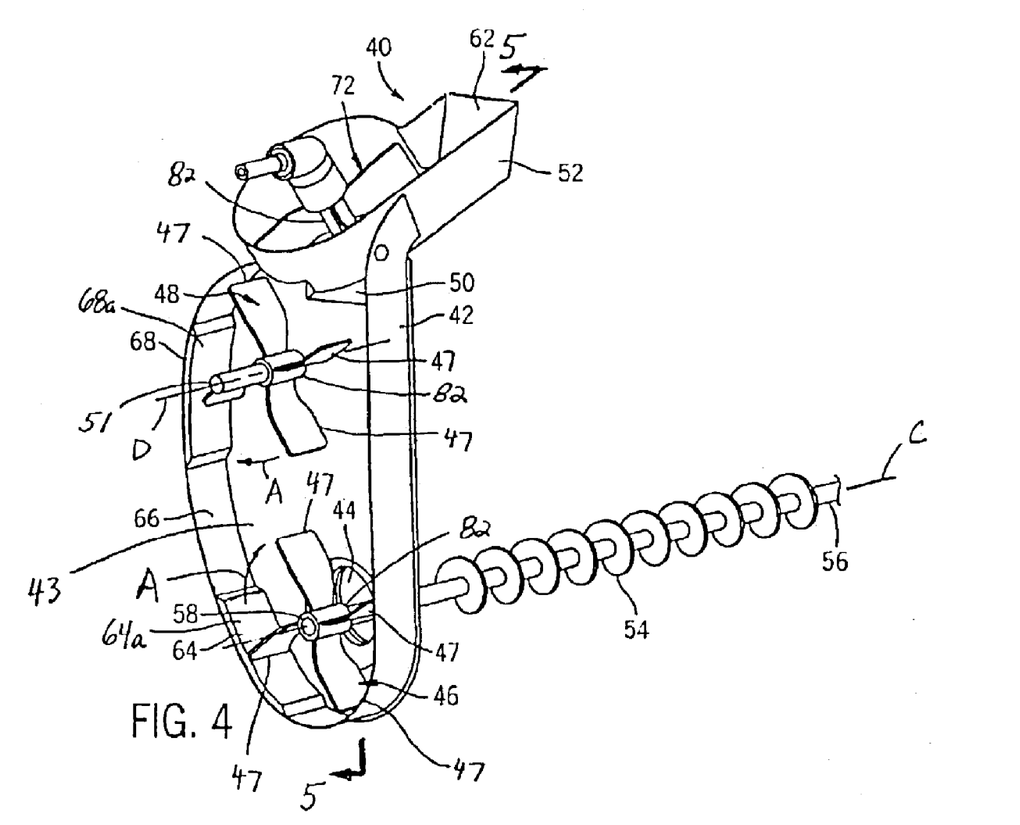
FIG. 4 is a simplified perspective view of the tailings conveyor of FIG. 2, showing the impellers.
Figure 5:
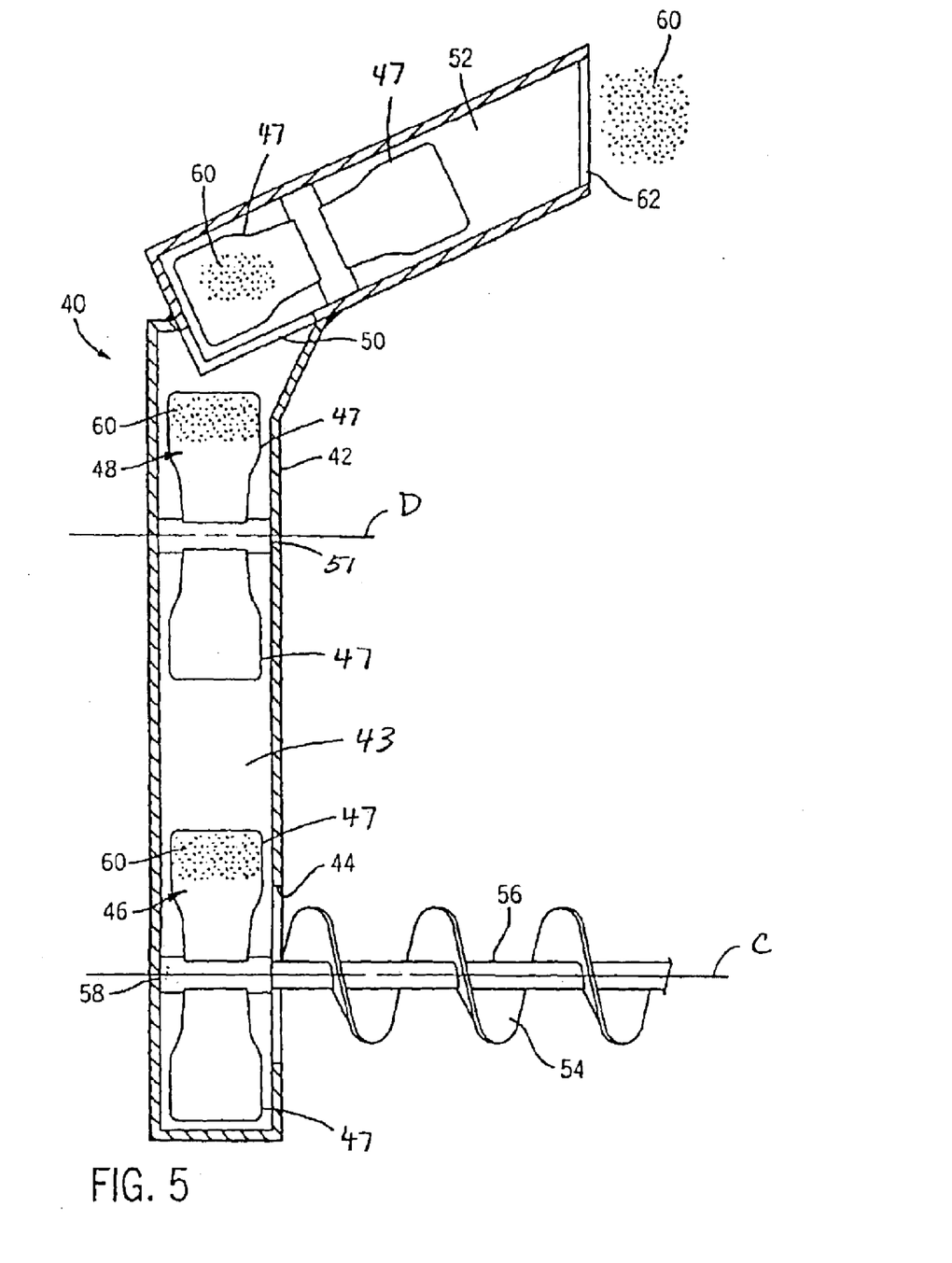
FIG. 5 is a simplified perspective view of the tailings conveyor taken along line 5—5 of FIG. 4.

Housing 42 receives the tailings through first opening 44 by means of a conventionally constructed and operable auger 54, as depicted in FIG. 3. Auger 54, as shown FIGS. 3, 4 and 5, rotates about rotational axis C on a shaft 56 coaxial with shaft 58 for moving the tailings toward tailings conveyor 40, such that the tailings will be discharged by auger 54 through first opening 44 into interior portion 43 of housing 42 in a position to be propelled by rotating first impeller 46 through interior portion 43 to second impeller 48. As an alternative, first opening 44 can be offset from the shaft 58, such as depicted at 44a in FIG. 6, so that, for instance, tailings 60 are delivered into housing 42 at a lower location or more in the vicinity of the radial outer portion of first impeller 46.

First impeller 46, second impeller 48, and third impeller 72 each include a plurality of blades 47 extending generally radially outwardly relative to the rotational axis of the respective impeller. Each of the blades 47 is preferably curved or arcuate so as to have a concave surface 47a facing oppositely of the rotational direction A, and a convex surface 47b facing forwardly in or toward the rotational direction A, such that each blade 47 is swept back relative to the rotational direction A, as best shown in FIG. 6.

The impellers 46, 48 and the second opening 50 are preferably radially in-line or aligned, such that tailings 60 which enter housing 42 at opening 44, or 44a, are propelled in rotational direction A by first impeller 46 along a radially inwardly facing threshing surface 64a of a first threshing plate 64, and into the path of rotation of radially adjacent second impeller 48, as denoted by large arrow B. Second impeller 48 will then propel tailings 60 in direction A along a radially inwardly facing threshing surface 68a of a second threshing plate 68, and through second opening 50 into conduit 52 into the path of rotation of third impeller 72, as also denoted by a large arrow B. Third impeller 72 will then propel tailings 60 through conduit 52, again as denoted by a large arrow B, so as to exit through a discharge outlet 62, so as to be spread over a predetermined region of chaffer sieve 26, or another location if desired. In interior portion 43 of housing 42, a radially inwardly facing common housing wall 66 guides and enhances the radial direction of travel of tailings 60 from first impeller 46 to second impeller 48. In conduit 52, a third threshing plate 80 can be provided having a radially inwardly facing threshing surface (not shown) for facilitating threshing by third impeller 72, and for guiding the tailings flow to conduit 52.

The preferred rotational direction A for both of impellers 46 and 48 is clockwise. The preferred rotation of impeller 72 is counterclockwise, however clockwise will also suffice. The curved or arcuate or swept back shape of blades 47 of impellers 46, 48 and 72 has been found to cause a more aggressive threshing of tailings 60 and forces the tailings 60 to the radially outer portion of the blades 47 faster, which has been found to increase conveying capacity. Threshing plate surfaces 64a, 68a and 80 may each have a rough surface texture or smooth, as desired, depending, for instance, on the crop material being processed and the extent of threshing function sought.

Figure 6:
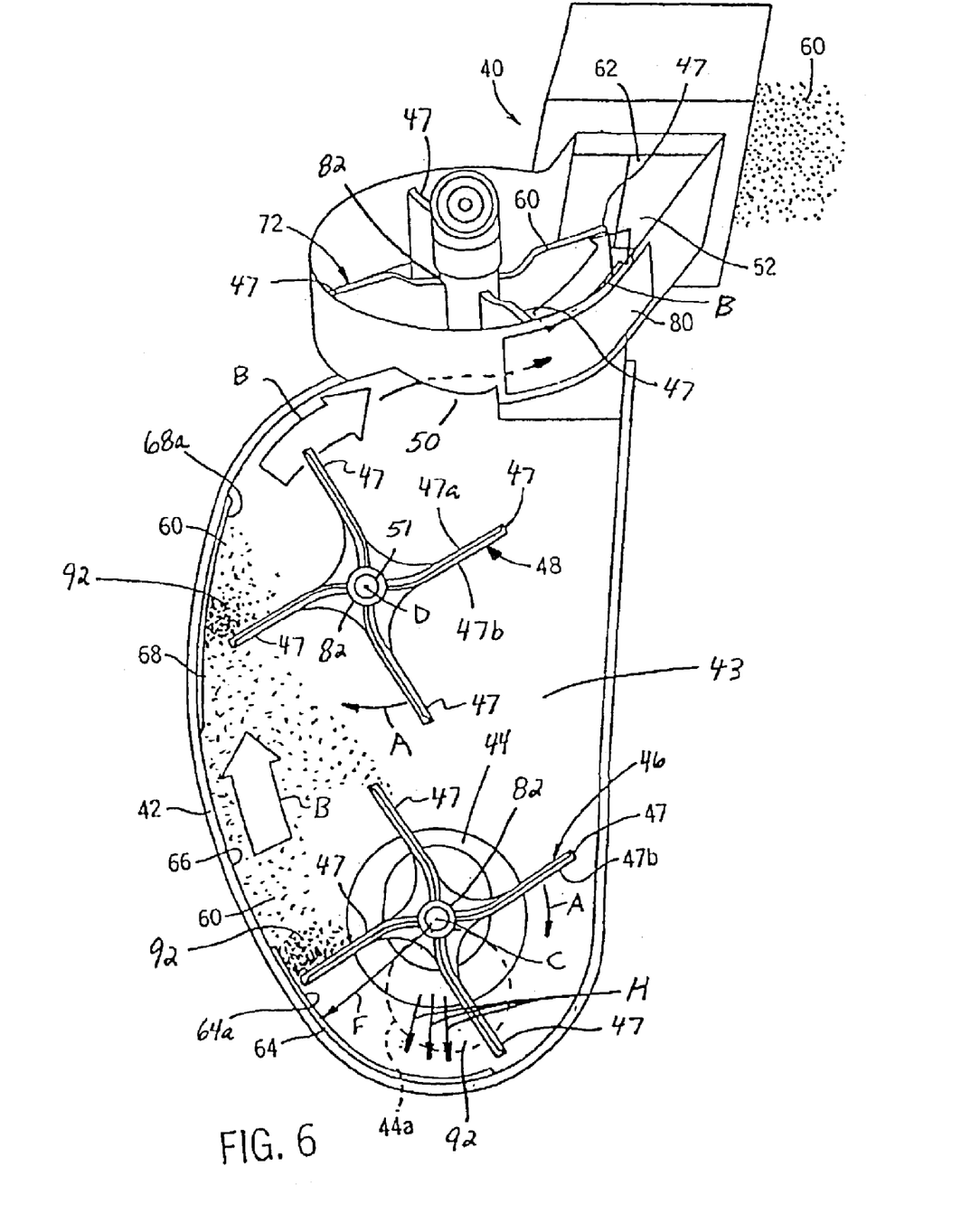
FIG. 6 is a frontal view of the tailings conveyor housing of FIG. 2 with the front cover removed and illustrating tailings being conveyed through the conveyor by the impellers.
Figure 7:
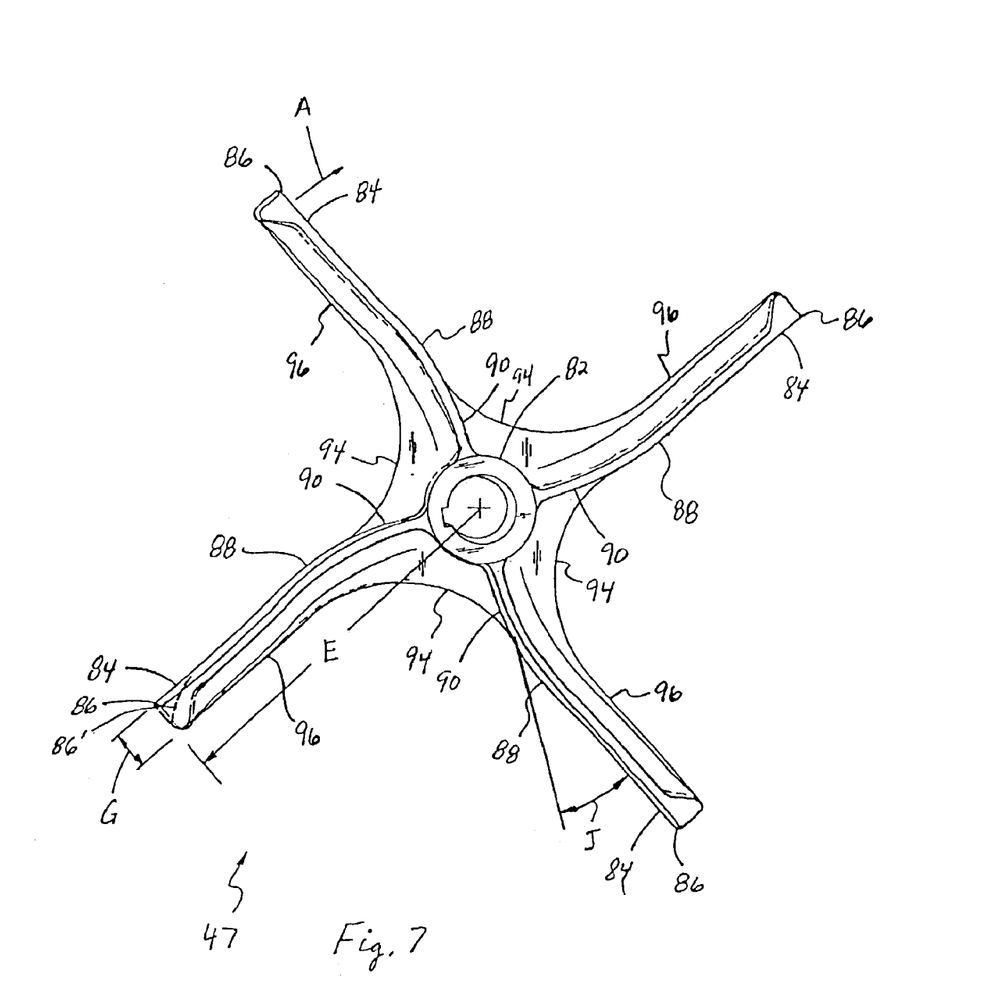
FIG. 7 is a frontal view of one of the impellers.
Figure 8:
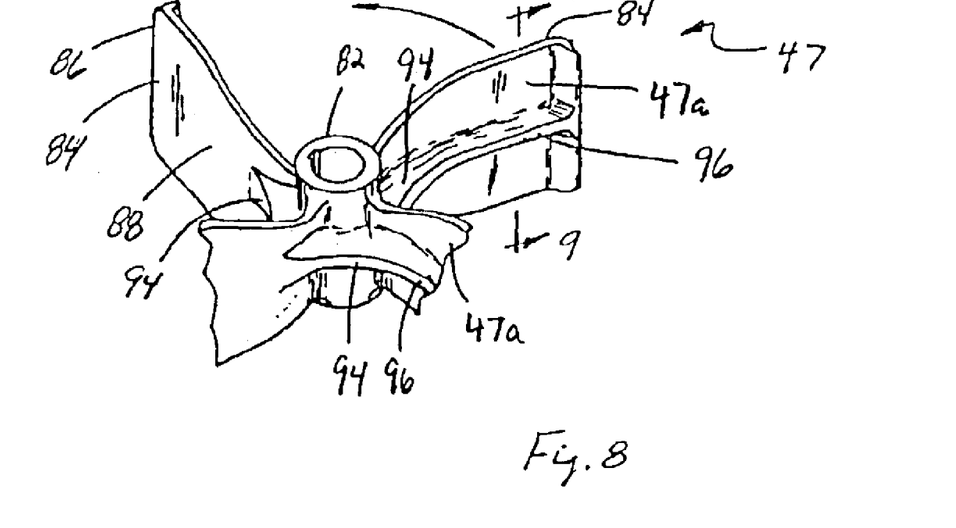
FIG. 8 is a fragmentary perspective view of one of the impellers.
Figure 9:
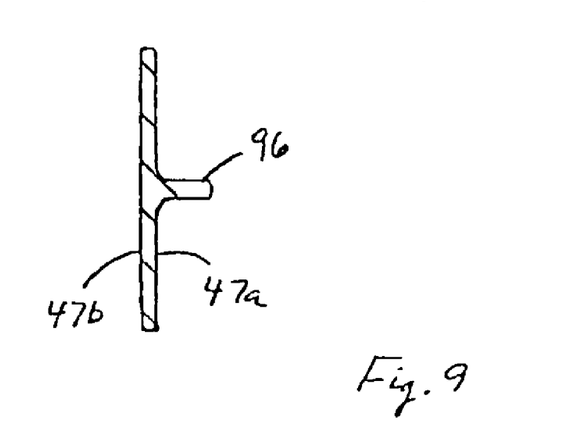
FIG. 9 is a sectional view taken along line 9—9 of FIG. 8.
Figure 10:
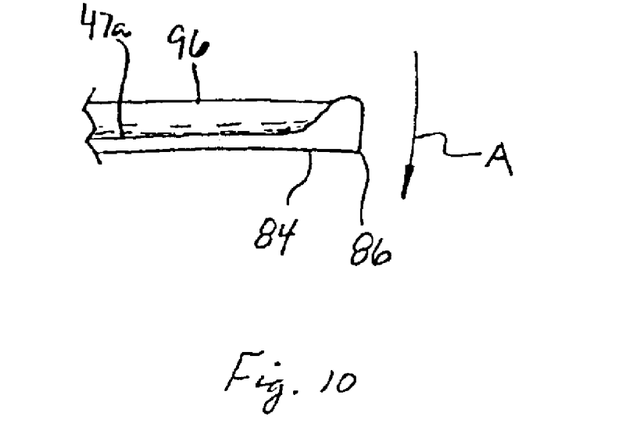
FIG. 10 is a fragmentary front view of a blade of one of the impellers, showing an extent of a radially outermost portion thereof in a rotational direction thereof.

Impellers 46, 48 and 72 each includes a mounting portion 82 which is preferably a hub, mountable to a rotatable member, such as shaft 58 of conveyor 40 in the instance of impeller 46, for rotation with the rotatable member in a predetermined rotational direction, such as direction A, about a rotational axis, such as axis C, as best shown in FIG. 6. Each impeller 46, 48 and 72 includes a plurality of blades 47, preferably four in number, which extend generally radially outwardly from mounting portion 82 at equally spaced locations around the rotational axis. As noted before, each blade 47 includes a surface 47a facing in a direction opposite the rotational direction, and a surface 47b facing in the rotational direction.

Referring also to FIGS. 7, 8, 9 and 10, a preferred embodiment of first impeller 46 is shown, which is also representative of preferred impellers 48 and 72 in both construction and operation. Surface 47b of each blade 47 of impeller 46 includes a radially outermost threshing portion 84 facing in rotational direction A and terminating at a radially outermost tip portion 86, and a tailings deflecting portion 88 which generally encompasses the convex region of the blade between threshing portion 84 and mounting portion 82. In operation, as tailings 60 are inducted into interior portion 43 of housing 42 through opening 44 or 44a, elements of the tailings, which will generally include some individual loose grain, grain partially or fully contained in pods or pod fragments, small straw pieces, pod fragments, and other plant fragments, will be impacted surface 47b and propelled or driven in direction A. In this context, it has been found that as a result of the convex shape of deflecting portion 88 of each blade, tailings 60 impacted thereby will be propelled or driven generally tangentially radially outwardly and forwardly, as illustrated by arrows H in FIG. 6, into the path of threshing portions 84 of blades 47. This will occur in a relatively turbulent manner, such that the individual tailings will collide randomly with each other and with threshing portion 84, and also with threshing surface 64a. As a result, at least some of the pods and pod fragments containing grain will be broken open to release the grain therefrom, for eventual cleaning or separation from the MOG in the cleaning system.

To facilitate or accentuate this threshing action, each blade 47 has a predetermined radial extent E as measured from the center of mounting portion 82 to tip portion 86 of the blade, which is a predetermined amount less than a predetermined minimum radial distance F from rotational axis C to threshing surface 64a (FIG. 6). As a result, tip portion 86 of each blade will pass in controlled, closely spaced relation to at least a desired portion of surface 64a, for instance, within ⅛ inch or so therefrom for some more common grains, such that the tailings will be carried or driven by tip portion 86 over surface 64a and will roll and tumble along surface 64a and be otherwise agitated so as to collide with the other tailings and threshing surfaces 64a and 84, and tip portion 86, such that at least some portion of remaining intact pods and other grain holding plant fragments will be broken open to release the grain therefrom.

As another result of the movement and action set forth above, some of the tailings, which have some abrasive properties, will pass and/or be dragged through the space between surface 64a and tip potion 86, such that wear of the affected surfaces will occur with use, particularly surface 64a and the surfaces of tip portions 86 facing in direction A. To maintain the radial length of blades 47 and provide desired impeller effective life under anticipated wear conditions, tip portions 86 each preferably have a predetermined thickness or extent G in direction A which is greater compared to the extent of most other portions of blade 47 in direction A. As a result, even as tip portion 86 wears or abrades away, as illustrated by dotted line 86' in FIG. 7, the radial extent E of blade 47 will remain substantially the same. Wear of tip portion 86 in a rearwardly curving manner such as illustrated at 86' is even contemplated to improve threshing function under some conditions. Also, threshing plate 64, or at least the portion thereof including threshing surface 64a, is preferably removable and replaceable and/or reversible.

As a result of the convex shape of deflecting portion 88 of the blades 47, threshing portion 84 is preferably swept back or extends more rearwardly relative to deflecting portion 88 in respect to rotational direction A, that is, oppositely to direction A, such that at least a portion of the deflected tailings are propelled forwardly of and into the path of threshing portion 84. Here, threshing portions 84 of blades 47 are shown swept back at an angle J of preferably about 30 degrees relative to a radial innermost portion 90 of each blade 47 extending between deflecting portion 88 and mounting portion 82, which has been found to be effective for a range of contemplated rotational speeds and grains. This swept back configuration, in combination with threshing surface 64a defines a space 92 forwardly of threshing portion 84 of each blade 47 in direction A (FIG. 6) where much of the above discussed threshing action takes place. The swept back configuration also facilitates accelerating and shedding of the tailings off of tip portions 86 of the blades after passing surface 64a, so as to be propelled toward second impeller 48.

Impeller 46 additionally includes radially outwardly extending webs 94 around mounting portion 82 connecting adjacent ones of blades 47, and ribs 96 extending radially outwardly from webs 94 along surfaces 47a for strengthening blades 47.

Here, it should be noted that although it is contemplated that second impeller 48 and third impeller 72 will be constructed the same and operate essentially the same as first impeller 46, it should also be noted that impellers 48 and 72 could be constructed differently, as required for providing different operating characteristics, as desired or required.

Figure 11:
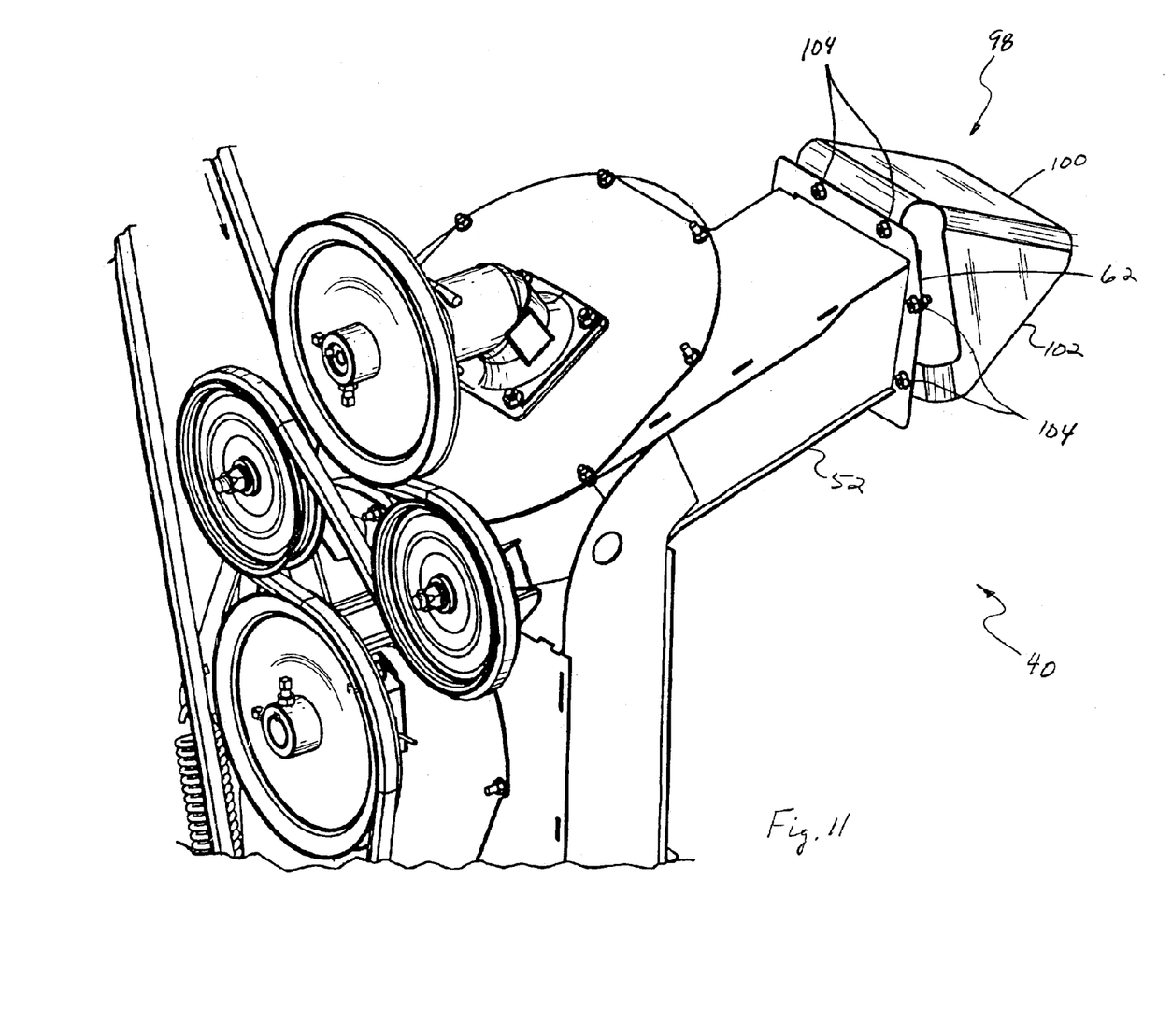
FIG. 11 is a detailed fragmentary perspective view of an upper end of the conveyor, showing a deflector according to the invention in position for deflecting and dispersing tailings discharged through a discharge outlet of the conveyor.
Figure 12:
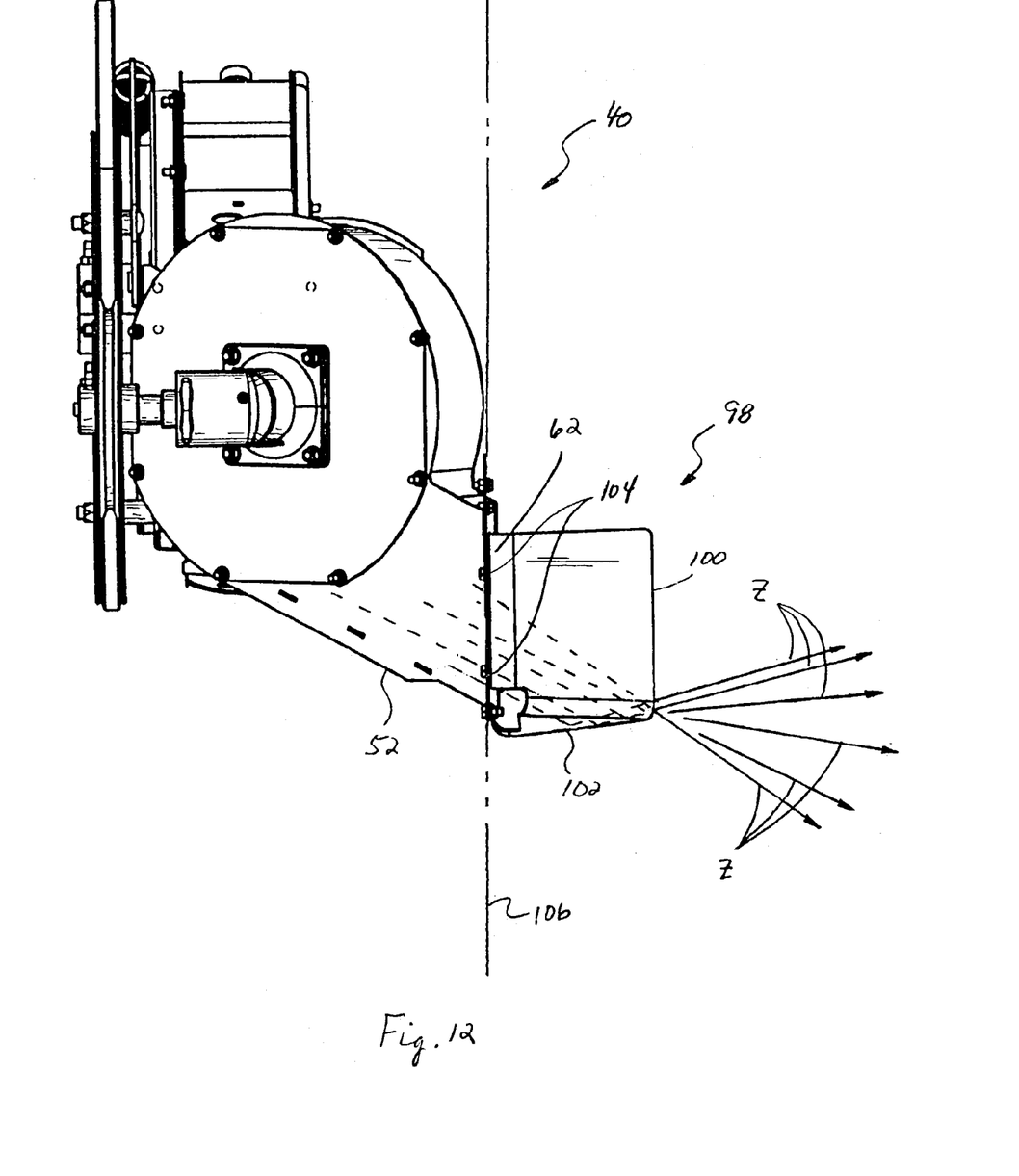
FIG. 12 is a detailed top view of the conveyor of FIG. 11 showing the deflector and illustrating tailings being deflected and dispersed thereby.
Figure 13:
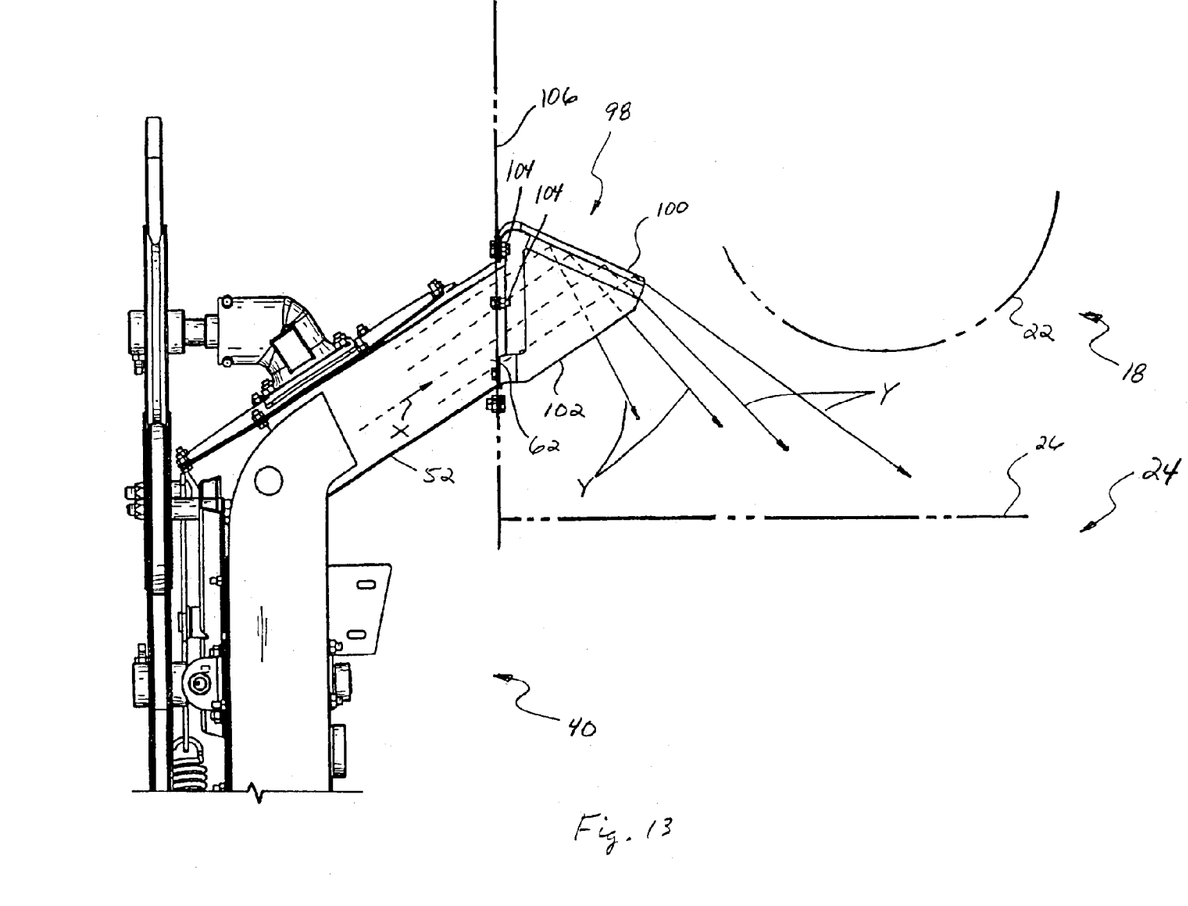
FIG. 13 is a detailed fragmentary side view of the upper end of the conveyor of FIG. 11 showing the deflector and illustrating tailings being deflected and dispersed thereby beneath a threshing assembly of the combine and over a sieve of a cleaning system thereof.

Referring also to FIGS. 11, 12 and 13, conveyor 40 additionally includes a deflector 98 for discharge outlet 62, for deflecting and dispersing tailings discharged therethrough over a predetermined region of chaffer sieve 26 of cleaning system 24. Deflector 98 preferably includes an upper deflector panel 100 positionable adjacent to an upper region of discharge outlet 62 so as to be located in a path of an upwardly directed flow of tailings discharged therethrough, denoted by arrow X in FIG. 13, for deflecting the flow downwardly and dispersing the flow vertically, as denoted by arrows Y. Additionally, deflector 98 includes a side deflector panel 102 positionable adjacent a side region of outlet 62 so as to be located in the path of at least a portion of the upwardly directed flow of tailings for deflecting and dispersing the flow horizontally, as denoted by arrows Z in FIG. 12. Deflector 98 can be mounted in position in any convenient desired manner, such as using bolts 104 through sheets which form conduit 52 around outlet 62. Outlet 62 is generally coincident with and extends through a side sheet 106 enclosing a side of combine 10 containing cleaning system 24 so as to be located above sieve 26. A rear end of threshing system 18 is located at a spaced distance above sieve 26 and is operable for discharging or dropping crop material on a predetermined region thereof, which is typically a forward region thereof. Front and rear oscillation of sieve 26 then carries the crop material rearwardly along the upper surface thereof, the smaller elements of the crop material being cleaned by falling through the sieve onto sieve 28 and the larger, lighter material including the straw and chaff being blown upwardly and rearwardly from the upper surface of sieve 26 and out a rear opening of the combine. It is important to not interfere significantly with the discharge or flow of material from the threshing system onto the upper surface of sieve 26 or the upward and rearward flow of straw and chaff when deflecting and dispersing the tailings from conveyor 40 onto sieve 26. Yet, it is desirable to spread the tailings such that no portion of sieve 26 is overloaded. The downward angle of upper deflector panel 100 of about 30 degrees to horizontal has been found to facilitate side to side spreading of the tailings over sieve 26, while the about 30 to about 40 degree angle of side deflector panel 102 to the flow through outlet 62 provides forward and rearward spread and dispersal. Upper deflector panel 100 also keeps tailings from being directed upwardly and held against perforated housing 22 of cleaning system 18. Side panel 102 is located adjacent to the forward side of outlet 62 to deflect the tailings rearwardly and there is no additional side panel at the rearward side, as it is not important for the application shown to deflect tailings from this side.

Here, it should be noted that deflector panels 100 and 102 can be positioned and oriented differently for different applications. Additionally, side deflector panel 102 can extend fully into the tailings flow, essentially as shown, or only partially therein, as desired or required for the dispersal sought.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A deflector for a discharge outlet of a tailings conveyor of an agricultural combine, comprising:
   an adjustable upper deflector panel positionable adjacent to an upper region of the discharge outlet so as to be located in a path of an upwardly directed flow of tailings discharged therethrough for deflecting the flow downwardly and dispersing the flow vertically; and
   a side deflector panel positionable adjacent a forward side region of the outlet, relative to a forward direction of operative travel of the agricultural combine, so as to be located in the path of at least a portion of the upwardly directed flow of tailings for deflecting and dispersing the flow horizontally.

2. The deflector of claim 1, wherein the discharge outlet is disposed above and adjacent to a side of an upwardly facing sieve surface of a cleaning system of the combine, and the deflector panels are mountable in relation to the discharge outlet for deflecting and dispersing the flow of tailings in a predetermined pattern over the surface region.

3. The deflector of claim 2, wherein the surface region has predetermined side-to-side and end-to-end extents and the deflector panels are mountable in relation to the discharge outlet for deflecting and dispersing the flow of tailings generally evenly over the surface region.

4. The deflector of claim 1, wherein the deflector panels are attached to a mounting element mountable around at learnt a portion of the discharge outlet.

5. The deflector of claim 1, wherein the path of the upwardly directed flow of tailings has a predetermined side-to-side extent and the side deflector panel is positionable so as to extend across at least a substantial portion of the side-to-side extent so as to horizontally deflect and disperse at least a substantial portion of the flow.

6. The deflector of claim 1, wherein the path of the upwardly directed flow of tailings has a predetermined side-to-side extent and the side deflector panel is positionable so as to extend partially across the side-to-side extent so as to horizontally deflect and disperse only a portion of the flaw.

7. The deflector of claim 1, wherein the side deflector panel is oriented at from about a 30 to about a 40 degree angle to the flow.

8. The deflector of claim 1, wherein the side deflector panel is positionable relative to the discharge outlet so as to be impinged by substantially all of the upwardly directed tailings flow.

9. The deflector of claim 1, wherein the deflector is open downwardly and in a sideward direction opposite the side deflector panel.

10. A tailings deflector for a discharge outlet of a tailings conveyor of an agricultural combine through which tailings will be discharged along an upwardly directed flow path, comprising:
    an adjustable upper deflector panel positionable adjacent to and above an upper region of the outlet so as to extend downwardly into the flow path at an acute angle to horizontal; and
    a single side deflector panel positionable adjacent a side region of the outlet so as extend into the flow path at an acute angle thereto,
    wherein a flow of the tailing discharged through the outlet along the flow path will impinge the panels and be deflected downwardly and outwardly away from the single side deflector panel so as to be dispersed over an area beneath the outlet.

11. The deflector of claim 10, wherein the discharge outlet is disposed above and adjacent to a side of an upwardly facing sieve surface of a cleaning system of the combine, and the deflector panels are mountable in relation to the discharge outlet for deflecting and dispersing the flow of tailing in a predetermined pattern over the surface region.

12. The deflector of claim 10, wherein the side deflector panel is oriented at from about a 30 to about a 40 degree angle to the flow.

13. The deflector of claim 10, wherein the side deflector panel extends into the flow path so as to be impinged by substantially all of the tailings flow.

14. The deflector of claim 10, wherein the deflector is open downwardly and in a sideward direction opposite the aide deflector panel.

15. The deflector of claim 10, wherein the flow of tailings has a predetermined side-to-side extent and the side deflector panel has an extent so as to extend partially across the side-to-side extent so as to horizontally deflect and disperse only a portion of the flow.

16. A tailings conveyor for an agricultural combine for returning tailings to a sieve of a cleaning system of the combine, comprising:
    a housing including an upwardly directed chute including a discharge opening adjacent to an upper end of the chute above a region of the sieve;
    at least one rotary impeller disposed in the housing and operable for propelling a flow of tailings through the chute and out of the housing through the discharge opening along an upwardly directed flow path oriented at an acute angle to horizontal, the region having a predetermined first horizontal extent generally in the direction of the flow path and a predetermined second horizontal extent generally perpendicular to the first extent; and
    adjustable deflector panels supported above and along one side of the discharge opening so as to extend downwardly into the flow path at an acute angle to horizontal and sidewardly into the flow path at an acute angle thereto, respectively, the deflector panels having sufficient extents in the direction of the flow path such that at least a substantial portion of the flow of tailings discharged through the discharge opening will impinge the panels and be deflected downwardly and dispersed substantially equally over the region of the sieve.

* * * * *